United States Patent [19]

Mitzkus et al.

[11] Patent Number: 4,878,689

[45] Date of Patent: Nov. 7, 1989

[54] COVER OF A DRIVER-SIDE GAS BAG COLLISION PROTECTION DEVICE IN MOTOR VEHICLES

[75] Inventors: Jürgen Mitzkus, Mutlengen; Dieter Wiesner, Schwäbisch Gmünd-Lindach, both of Fed. Rep. of Germany

[73] Assignee: TRW Repa GmbH, Alfdorf, Fed. Rep. of Germany

[21] Appl. No.: 224,904

[22] Filed: Jul. 27, 1988

[30] Foreign Application Priority Data

Sep. 30, 1987 [DE] Fed. Rep. of Germany ... 8713154[U]

[51] Int. Cl.$^4$ .................. B60R 21/05; B60R 21/20
[52] U.S. Cl. ................................. 280/731; 280/743
[58] Field of Search .............. 280/743, 731, 732; 150/52 M; 74/558.5

[56] References Cited

U.S. PATENT DOCUMENTS

| | | | |
|---|---|---|---|
| 3,189,367 | 6/1965 | Glass | 74/558.5 |
| 3,756,617 | 9/1973 | Brown | 280/732 |
| 4,334,699 | 6/1982 | Patzelt et al. | 280/731 |
| 4,752,083 | 6/1988 | Honda | 280/731 |

FOREIGN PATENT DOCUMENTS

| | | | |
|---|---|---|---|
| 3116538 | 11/1982 | Fed. Rep. of Germany | 280/732 |
| 3710417 | 3/1988 | Fed. Rep. of Germany | 280/743 |

*Primary Examiner*—Charles A. Marmor
*Assistant Examiner*—Karin Tyson
*Attorney, Agent, or Firm*—Tarolli, Sundheim & Covell

[57] ABSTRACT

The invention provides a cover of a driver-side gas bag collision protection device accommodated in the steering wheel in motor vehicles. The cover comprises two cover portions which are each secured to a housing accommodating the gas bag collision protection device via an outer edge region permitting the cover portions to fold open and are connected together at their center edge region along a tear line by weakened wall portions. Each cover portion comprises a reinforcing insert embedded in foamed plastic. The reinforcing insert is formed by a metal plate, preferably of aluminium, and extends out of the outer edge region of each cover portion and terminates in lug-like securing portions.

5 Claims, 1 Drawing Sheet

COVER OF A DRIVER-SIDE GAS BAG COLLISION PROTECTION DEVICE IN MOTOR VEHICLES

The invention relates to a cover of a driver-side gas bag collision protection device accommodated in the steering wheel in motor vehicles comprising two cover portions which are each secured to a housing accommodating the gas bag collision protection device via an outer edge region permitting the cover portions to fold open and are connected together at their centre edge region along a tear line by weakened wall portions, each cover portion comprising a reinforcing insert embedded in foamed plastic.

In known covers of this type the reinforcing insert is formed by a textile fabric. Textile fabrics, which are available with high tear resistance, are well suited as reinforcing insert of the cover because firstly they ensure good bonding to the surrounding foamed plastic and secondly offer hardly any resistance to the folding open movement of the cover portions. However, the dimensional stiffness of such a cover is not satisfactory. Moreover, it is very difficult to impart to the textile fabric the desired arched form necessary at the edge regions and consequently economic mass production in satisfactory quality is hardly possible.

The present invention provides a cover for a driver-side gas bag collision protection device accommodated in the steering wheel in motor vehicles which can be made by an easily controllable mass production method in the desired quality and moreover has good dimensional stiffness.

The cover of the present invention has a reinforcing insert which is formed by a metal plate which extends out of the outer edge region of each cover portion and terminates in lug-like securing portions. A reinforcing insert made of sheet metal or metal plate, in particular aluminium sheet, can easily be brought with narrow production tolerances into the desired generally arched form. A good mechanical bonding is also achieved in the embedding in the usual foamed plastic compositions. Furthermore, the cover with a reinforcing insert consisting of sheet metal has a high dimensional stiffness. It has been found that nevertheless the outer edge regions of the cover portions can be deformed easily enough to permit satisfactory folding open of the cover portions under the action of the unfolding gas bag.

In a preferred embodiment the folding open of the cover portions under the action of the unfolding gas bag is facilitated in that the metal plate forming the reinforcing insert is perforated in the outer edge regions of the cover portions. The perforating of the metal plate also improves the bonding to the surrounding foamed plastic.

According to an advantageous further development of the invention which can be used with a cover arched or curved at the outer edge regions the metal plate is bent in at the transition to the lug-like securing portion and led out of the foamed plastic embedding and thereafter at least approximately perpendicularly bent and led along the inner surface of the outer edge region of the cover portion. This configuration promotes the hinge effect in the outer edge regions of the cover portions. Nevertheless, this configuration of the metal plate in the outer edge regions of the cover portions contributes to the dimensional stiffness in these edge regions.

A further advantageous embodiment of the invention resides in that the metal plate is folded over outwardly at the centre edge region of the cover portions along the tear line. In this manner, firstly the bonding of the metal plate to the foamed plastic embedding in the critical region along the tear line is improved and secondly the occurrence of sharp edges in the region of the tear line after springing open of the cover portions is avoided, thus eliminating any danger of injury thereby.

The mechanical stressability of the lug-like securing portions is increased according to a further advantageous development in that at their ends they are reinforced by folded-over tabs through which securing holes can extend.

Further advantages and features of the invention will be apparent from the following description of a particular embodiment and from the drawings to which reference is made and in which.

Figure 2:
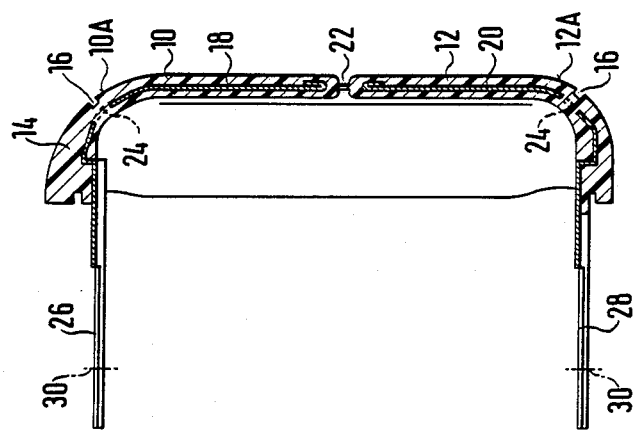
FIG. 2 is a section along the line II—II of FIG. 1.
Figure 1:
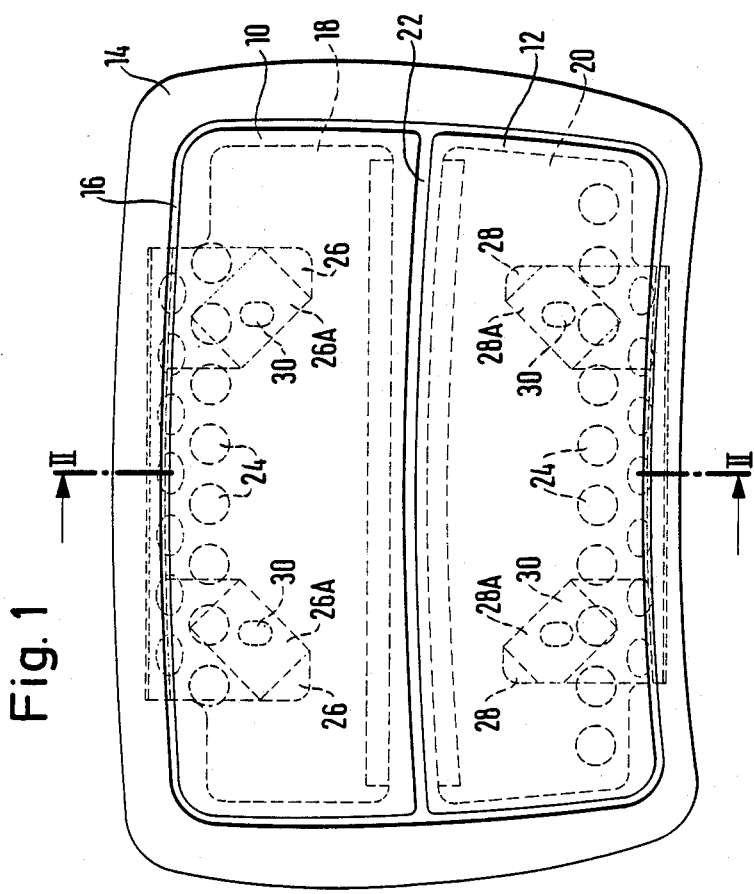
FIG. 1 is a plan view of a cover according to the invention.

The generally arched cover of a driver-side gas bag collision protection device accommodated in the steering wheel consists of two cover portions 10, 12 and a frame 14 surrounding them. The two cover portions 10, 12 are made generally rectangular. The outer edge regions 10A, 12A of the cover portions 10, 12 are convexly arched and merge into the likewise arched frame 14. In the transition region between the cover portions 10, 12 and the frame 14 there is an encircling groove 16. Each cover portion 10, 12 consists of an outer preferably grained plastic sheet, a reinforcing insert 18 and 20 and surrounding foamed plastic in which the reinforcing insert 18 or 20 is embedded. The two cover portions 10, 12 are connected at their centre edge region along a tear line 22 by a weakened wall strip.

The reinforcing inserts 18, 20 are each formed by a metal plate, preferably aluminium sheet. Each of the two metal plates is folded over outwardly at its edge adjacent the tear line 22. Furthermore, each metal plate comprises in the arched outer edge region of the respective cover portion 10, 12 a perforation consisting of a plurality of holes 24 arranged in two parallel rows at equal distances apart. The holes 24 are substantially at the level of the groove 16. Following the perforated region each metal plate extends into the frame 14 but before reaching the outer edge of the frame 14 is bent abruptly inwardly and led out of the foamed plastic embedding and bent approximately at right-angles and led along the inner surface of the frame 14 to terminate in the lug-like securing portions 26, 28. Said lug-like securing portions 26, 28 are reinforced at their outer ends by folded-over tabs 26A, 28A through which the securing holes 30 extend. Said securing holes 30 are made as slots to permit adjustment of the cover.

When the gas bag disposed beneath the cover unfolds the two cover portions 10, 12 are separated from each other along the tear line 22 and outwardly opened by the progressive expansion of the gas bag. Although the reinforcing insert 18, 20 consisting of a metal plate imparts a high dimensional stiffness to the cover the arched outer edge regions, weakened by the holes 24, act in the manner of a hinge which permits easy springing open of the cover portions 10, 12. This hinge action is supported by the shaping of the metal plate in the frame 14; the double angling of the metal plate in this region increases its dimensional stiffness. The reinforcing inserts 18, 20 can be easily punched out of the aluminium sheet with the desired precision and shaped. On embedding the metal plate in the usual foamed plastic a good bonding is achieved between the plastic composition and the metal plate, particularly in the region of the inner folded-over edges and holes 24. Since the free ends of the metal plates are at the same time formed as lug-like securing portions 26, 28 easy assembly of the cover is also achieved without special additional components.

We claim:

1. A cover of a driver-side gas bag collision protection device accommodated in the steering wheel of a motor vehicle, said cover comprising two cover portions, each of said cover portions having an outer edge region permitting the cover portions to fold open, said cover portions being connected together at their center edge region along a tear line by weakened wall portions, each cover portion comprising a reinforcing insert embedded in foamed plastic, said reinforcing insert being formed by a metal plate which extends out of the outer edge region of each cover portion and terminates in lug-like securing portions, said cover including a frame having an inner surface, each cover portion being arched at its outer edge region adjoing said frame, said metal plate being connected to said frame and having a transition portion to said lug-like securing portions comprising: a first portion within said frame, a second portion extending inwardly from said first portion through said inner surface and out of said foamed plastic, and a third portion extending approximately perpendicular to said second portion and along said inner surface of said frame and terminating in said lug-like securing portions.

2. The cover according to claim 1, wherein said metal plate is folded over outwardly along said tear line at the centre edge region of the cover portions.

3. The cover according to claim 1, wherein said metal plate is perforated at least in the outer edge regions of the cover portions.

4. The cover according to claim 1, wherein said lug-like securing portions are reinforced at their ends by folded-over tabs through which securing holes extend.

5. The cover according to claim 1, wherein said metal plate consists of aluminium.

* * * * *